United States Patent [19]
Kingston et al.

[11] Patent Number: 5,099,494
[45] Date of Patent: Mar. 24, 1992

[54] SIX CHANNEL DIGITAL DEMODULATOR

[75] Inventors: Samuel C. Kingston; Steven T. Barham, both of Salt Lake City; Harold L. Simonsen, West Valley City, all of Utah

[73] Assignee: Unisys Corporation, Blue Bell, Pa.

[21] Appl. No.: 559,012

[22] Filed: Jul. 26, 1990

[51] Int. Cl.$^5$ ............................................. H04L 27/30
[52] U.S. Cl. .................................... 375/1; 380/34; 329/310; 375/80; 375/82; 375/94
[58] Field of Search ................................. 375/80-82, 375/94-96; 329/303, 309, 310, 341-343

[56] References Cited

U.S. PATENT DOCUMENTS

| | | | |
|---|---|---|---|
| 3,992,617 | 11/1976 | Epstein | 329/303 X |
| 4,910,469 | 3/1990 | Takahashi | 329/341 X |
| 4,933,952 | 6/1990 | Albrieux et al. | 375/1 |

Primary Examiner—Bernarr E. Gregory
Attorney, Agent, or Firm—John B. Sowell; Mark T. Starr

[57] ABSTRACT

A six channel programmable digital demodulator of the type designed to be manufactured as an integrated circuit with other components comprises a code channel, a level channel and a phase channel each of which includes two accumulate and scale circuits. Each of the accumulate and scale circuits is connected to an I or a Q channel of the data which has been despread after being received from the communications receiver. The outputs of two of the accumulate and scale circuits are applied to a two to one multiplexor which is controlled by a command generator to provide a selectable output defining a clock error signal. The remaining four accumulate and scale circuits are connected to a first four to one multiplexor to provide a selectable output defining a clock error signal. The same four remaining outputs from said accumulate and scale circuits are connected to a second four to one multiplexor having an output defining a carrier error signal.

6 Claims, 2 Drawing Sheets

SIX CHANNEL DIGITAL DEMODULATOR

BACKGROUND OF THE INVENTION

1. Field of the Invention

The present invention relates to a digital demodulator for processing chips or samples of input data and deriving signals which define the timing, phase or frequency error and signal level of the data. More particularly, the present invention relates to a six channel programmable digital demodulator which can be programmed or commanded to be refigured so as to acquire, track and demodulate data.

2. Description of the Prior Art

Heretofore, individual channels for processing and demodulating an input data stream to produce timing signals, signal energy levels and carrier phase or frequency error signals were known in both analog and digital form. Digital demodulating circuits have been proposed which employ special chips made for each of the channels or functional loops that were so complex that they required individual chips for code, phase and frequency tracking. Such prior art chips were hardware configurable and arranged as modules in a custom made demodulator for one of several purposes It would be highly desirable to provide a new digital demodulator circuit which is so simple that it may be implemented on a single very large scale integrated circuit chip and is remotely programmable or commandable for multiple use.

SUMMARY OF THE INVENTION

It is a principal object of the present invention to provide a novel programmable digital demodulator having a code error channel, a signal level channel and a phase or frequency error channel.

It is a principal object of the present invention to provide a novel programmable digital demodulator implemented on a single chip and capable of processing several different data formats in modulated or unmodulated form.

It is another principal object of the present invention to provide a digital demodulator which does not require hardware reconfiguration to accomplish multiple uses.

It is another object of the present invention to provide a novel demodulator circuit capable of processing independent pseudo noise (PN) modulation codes and data rates.

It is a general object of the present invention to provide a novel programmable digital demodulator that is simple and reliable and easily implemented on one single very large scale integrated circuit with other components.

According to these and other objects of the present invention there is provided a novel digital demodulator which comprises three despreaders connected to the input data stream and having plural outputs which define the code channel, the level channel and the phase channel. The real and imaginary channel outputs from the despreaders are connected to individual accumulate and scale circuits which operate as data rate filter means and have real and imaginary outputs defining six channels The six channel outputs from the accumulate and scale circuits are coupled to three multiplexors and the outputs of the three multiplexors are coupled to decision directed inverters in a manner which provides a clock error signal, a signal level used for acquisition and track and a carrier error signal.

DESCRIPTION OF THE PREFERRED EMBODIMENT

Figure 1:
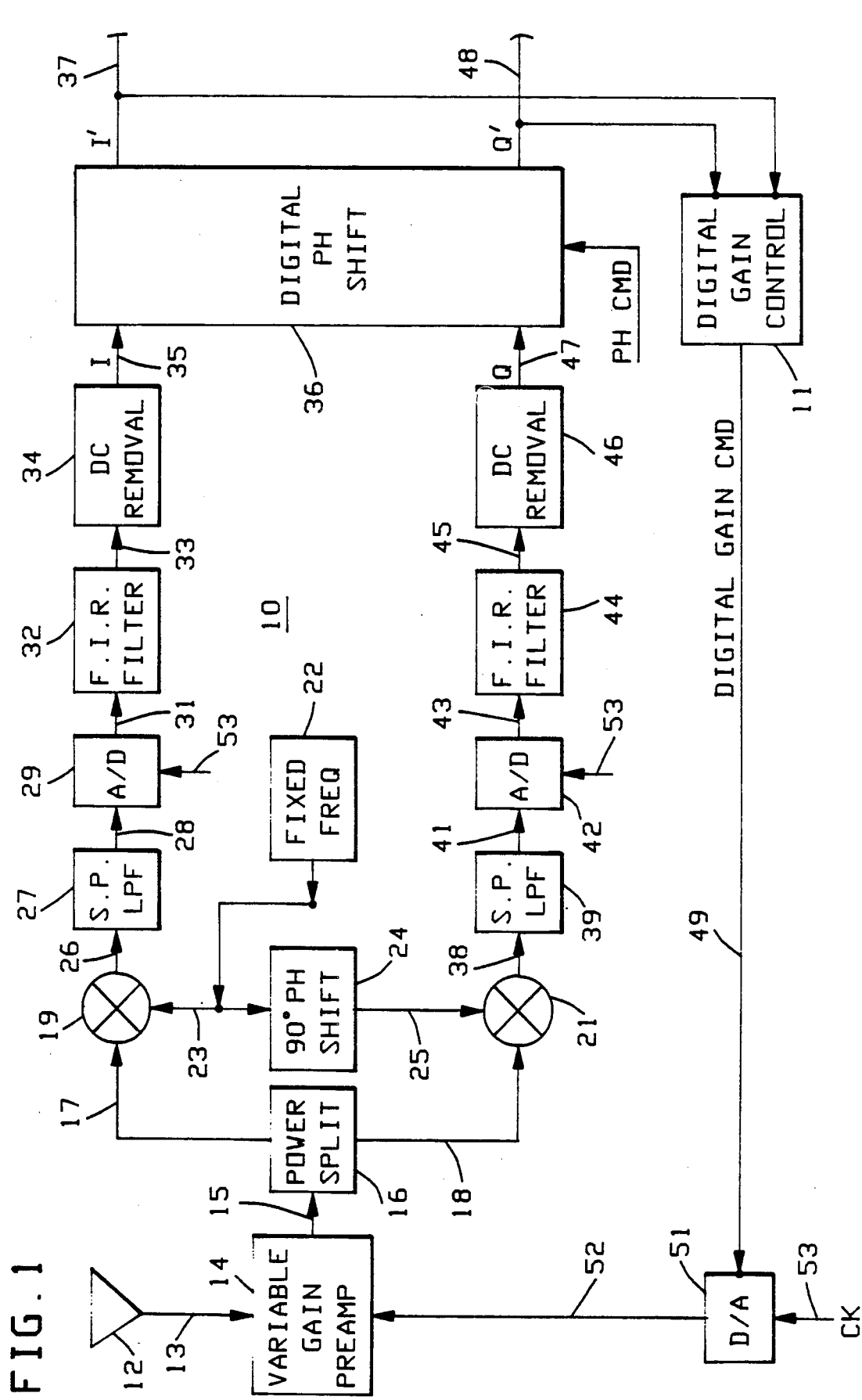
FIG. 1 is a schematic block diagram of a communications receiver pre-processing circuit illustrating a preferred embodiment use of the present invention programmable digital modulator.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real shifter 36 of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S Pat. No. , 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals such as that shown on line 53 are applied to the digital blocks which occur after the A to D converters 29 and 42. The low pass filters 27 and 39 may be constructed as RC filter circuits and the FIR filters 32 and 44 may be constructed in the manner shown in my U.S. Pat. No. 4,808,939. It will be understood that all of schematic blocks shown in the FIG. 1 embodiment need not be constructed according to my previously mentioned patents but may be constructed by other equivalent circuits known in the prior art.

Figure 2:
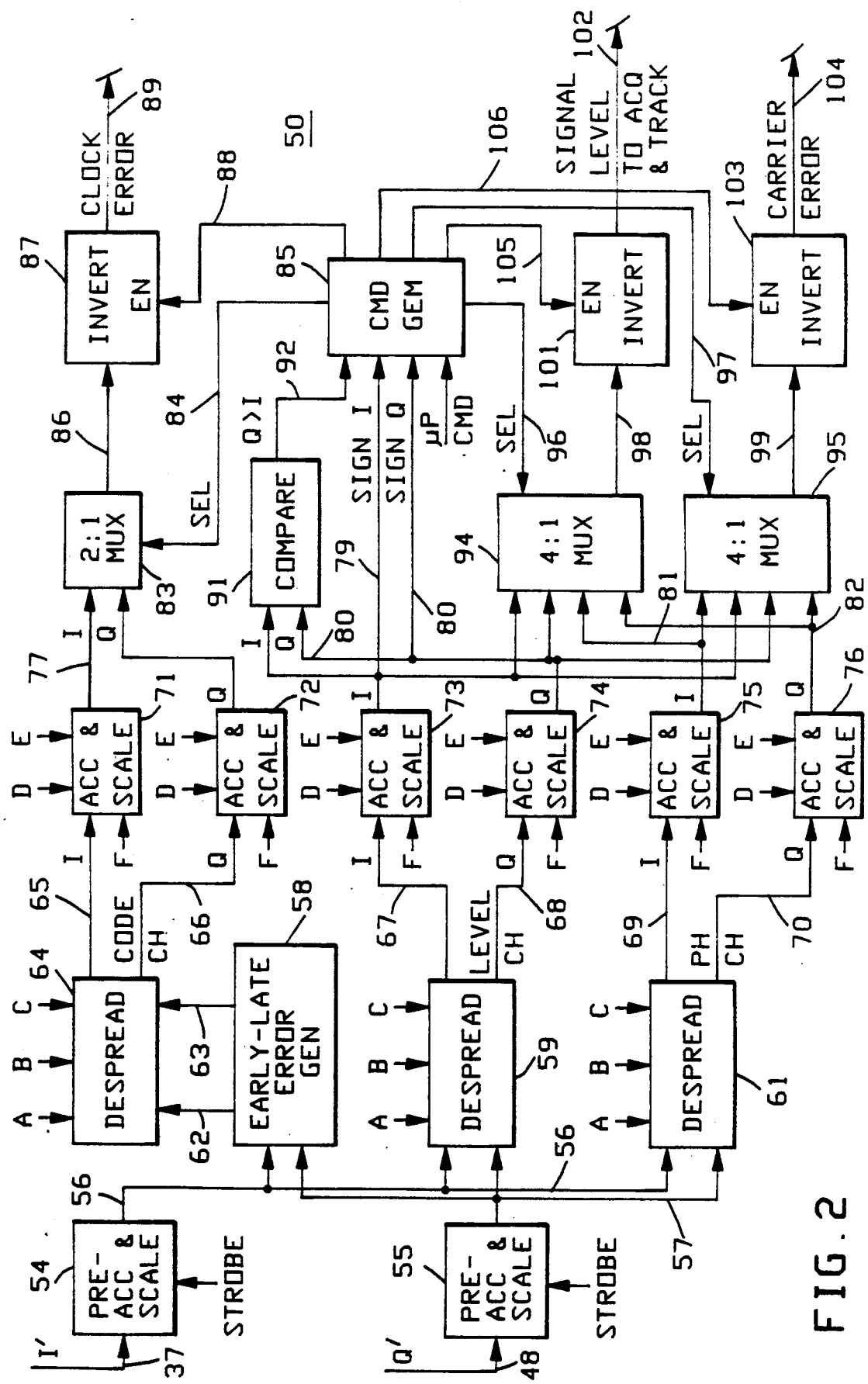
FIG. 2 is a schematic block diagram of a preferred embodiment present invention six channel programmable digital demodulator.

Refer now to FIG. 2 showing a schematic block diagram of a preferred embodiment six channel programmable digital demodulator 50. The data on lines 37 and 48 is representative of the real and imaginary phase compensated data processed in FIG. 1. The data on lines 37 and 48 is preferably applied to pre-accumulate and scale circuits 54 and 55 before being applied to the demodulator 50 on lines 56 and 57 respectively. Both the I and Q data on lines 56 and 57 is applied to an early-late error generator 58 and a pair of despreaders 59 and 61. The output of the early late error generator 58 on lines 62 and 63 is applied to a third despreader 64. The despreaders 59, 61 and 64 are shown having inputs A, B and C which receive the real or I PN signal, the imaginary or Q PN signal and the quad or two channel microprocessor command which is remotely programmable as inputs to the three despreaders. The processed output from despreader 64 is representative of the code channel The processes output of the despreader 59 is representative of the signal level channel and the output from the despreader 61 is representative of the phase channel which will now be explained. The I and Q inputs on all 6 channels 65 to 70 are applied to individual accumulate and scale circuits 71 through 76 respectively. Each accumulate and scale device has an I or a Q output on lines 77 through 82 respectively. Each accumulate and scale device 71 through 76 is shown having a D input which enables the accumulate and scale circuit and an E input representative of a bit data rate strobe. The unnumbered strobes applied to the pre-accumulate and scale devices are chip rate strobes.

Each of the accumulate and scale devices 71 through 76 is shown having an F input which is the bias removal enable input to a bias removal circuit of the type which adds 1 bit every other enable signal to compensate for truncation of least significant bits of data upstream.

The data being processed in the I and Q channels (code channel) on lines 77 and 78 is applied to a multiplexor 83 which is controlled by a channel selection signal on line 84 from the command generator 85. The single output from the multiplexor 83 on line 86 is applied to a decision directed inverter 87 having its command or enable input applied thereto via line 88 to produce a clock error output on line 89. The clock error signal on line 89 is applied to a loop filter before being applied to a clock synthesizer to produce the system and sampling clocks and strobes.

The I and Q outputs from the accumulate and scale circuits 73 and 74 on lines 79 and 80 are applied to a comparator 91 to produce a high output signal on line 92 when the magnitude of the Q signal is higher than the magnitude of the I signal. The sign bit from the data on lines 79 and 80 is also applied directly to the command generator 85. The sign information applied to the command generator is the hard decision on the I and Q channel data. The microprocessor command on line 93, applied to the command generator 85, is employed to control the multiplexors 84, 94 and 95 via their selection circuits 84, 96 and 97 in response to the input information on line 92 and 93. The command generator is capable of instructing the three multiplexors to select any one of their two or four I or Q inputs for the selected output on lines 86, 98 and 99 respectively. The selection may be predicated upon whether Q is larger than I or upon which channel has data available. The level channel inputs to multiplexor 94 are processed to produce an output signal on line 98 to the decision directed inverter 101 to produce an output signal or signal level on output line 102 which is applied to the acquisition or track circuits (not shown).

The four I and Q input signals to multiplexor 95 in the phase channel produced an output error signal on line 99 which is applied to a decision directed inverter 103 to produce a desired carrier error signal on line 104.

A synthesizer clock (not shown) which is coupled to the receive clock error signal on line 89 is a commercially available and known device and do not constitute a part of the present invention. The acquisition and track circuits (not shown) which are coupled to the signal level magnitude on line 102 are known circuits employed in communications receivers and does not constitute a part of the present invention. The carrier error signal on line 104 which is applied to the carrier tracking loop is a known circuit and does not constitute a part of the present invention.

Having explained a preferred embodiment of the present invention digital demodulator circuit having six independent I and Q channels and three functional channels it will be understood that the present invention comprises an extremely simple and reliable circuit which may be easily implemented in a very large scale integrated circuit with other components of the communications receiver. A feature of the present invention is that the pre-accumulate and scale circuits 54 and 55 may be effectively programmed by changing the chip strobe rate. The despreaders 64, 59 and 61 may be programmed by the C input for selection of quad or two-channel operation. The accumulate and scale circuits 71 through 76 may be programmed by selecting or changing the bit data rate strobe on input E as well as the enable strobe on input D. It will be understood that the accumulate and scale circuits 71 through 76 are also scale function programmable by an input (not shown) which is generated at a remote controller or microprocessor. Further, a remote controller or microprocessor may produce a programmable command on line 93 to the command generator 85 which further adds flexibility to the programming of the novel digital demodulator.

It will further be understood that the command generator need not be an intelligent controller but may be a simplified form of a look up table or programmable array thus further simplifying the ease of implementation of the novel digital demodulator in a very large scale integrated circuit chip.

It will be understood that one of the commands to the command generator 85 is to ignore the hard decision data sign bit which is employed on lines 88, 105 and 106 so that the information inputted to the decision directed inverters is never changed. This may occur when the accumulator and scale inputs have chip times which are not modulated with data and these chip times may be selected by using the enable input to the accumulate and scale circuits at the appropriate time. When the data is modulated on lines 86, 98 and 99 to the input of the decision directed inverters 87, 101 and 103 it is necessary to determine the actual sign of the data and pass or invert the data depending on the positive or negative sign of the data to compensate for an improper or unknown data sign on lines 86, 98 and 99.

What is claimed is:

1. A programmable digital demodulator circuit of the type used for processing real (Q) and imaginary (I)

process data signals for use in communication receivers, comprising:
- a code channel despreader,
- a level channel despreader,
- a phase channel despreader,
- said real (I) and the imaginary (Q) process data signals from said communications receiver being coupled to each said despreader,
- each said despreader having an I and a Q output signal individually connected as inputs to a data rate filter means having six output signals which define three I and three Q channels,
- a first multiplexor being connected to a pair of I and Q channels to provide a selectable output signal representing a clock error signal,
- a second multiplexor being connected to the remaining I and Q channels to provide a selectable output signal representing a magnitude level signal,
- a third multiplexor being connected to said remaining I and Q channels to provide an output signal representing a carrier error signal, and
- programmable command generators means connected to each of said multiplexors for selecting one of a plurality of inputs for each multiplexor output.

2. A programmable digital demodulator as set forth in claim 1 which further includes a decision directed invertor for each multiplexor being connected in the output signal path of each of said multiplexors being connected in the output signal path of each of said multiplexors.

3. A programmable digital demodulator as set forth in claim 2 wherein each decision directed invertor is individually connected to said programmable command generator means.

4. A programmable digital demodulator as set forth in claim 1 wherein said data rate filter means comprises programmable accumulate and scale circuit means.

5. A programmable digital demodulator as set forth in claim 1 which further includes a programmable chip rate filter means having output signals which provide the I and Q input data applied to said despreaders.

6. A programmable digital demodulator as set forth in claim 5 wherein each said rate filter means comprises a programmable pre-accumulate and scale circuit.

* * * * *